July 13, 1937.  H. HOLZWARTH  2,086,553
APPARATUS FOR CARRYING THE PEAK LOADS OF POWER PLANTS
Filed Oct. 19, 1933  5 Sheets-Sheet 5
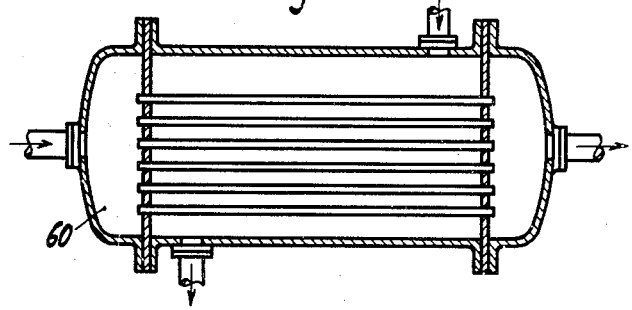
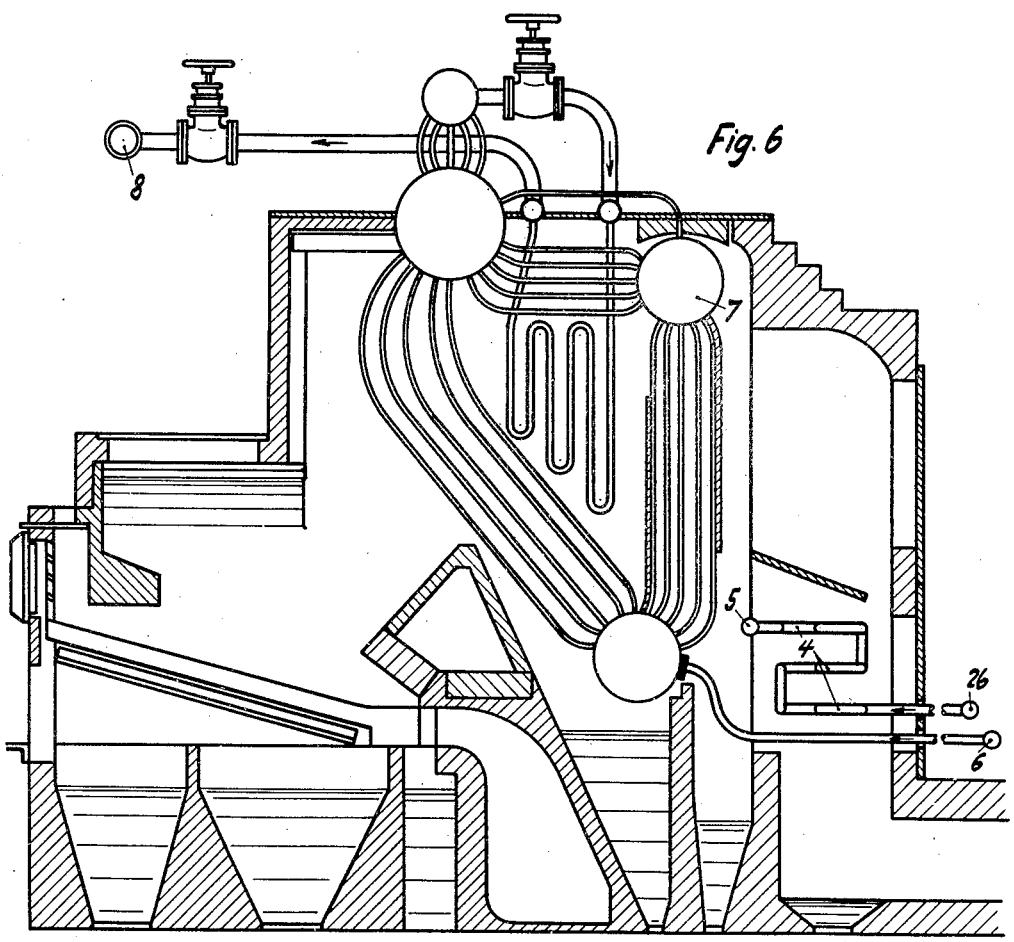
INVENTOR
HANS HOLZWARTH
BY
*Joseph Hirschman*
ATTORNEY Patented July 13, 1937

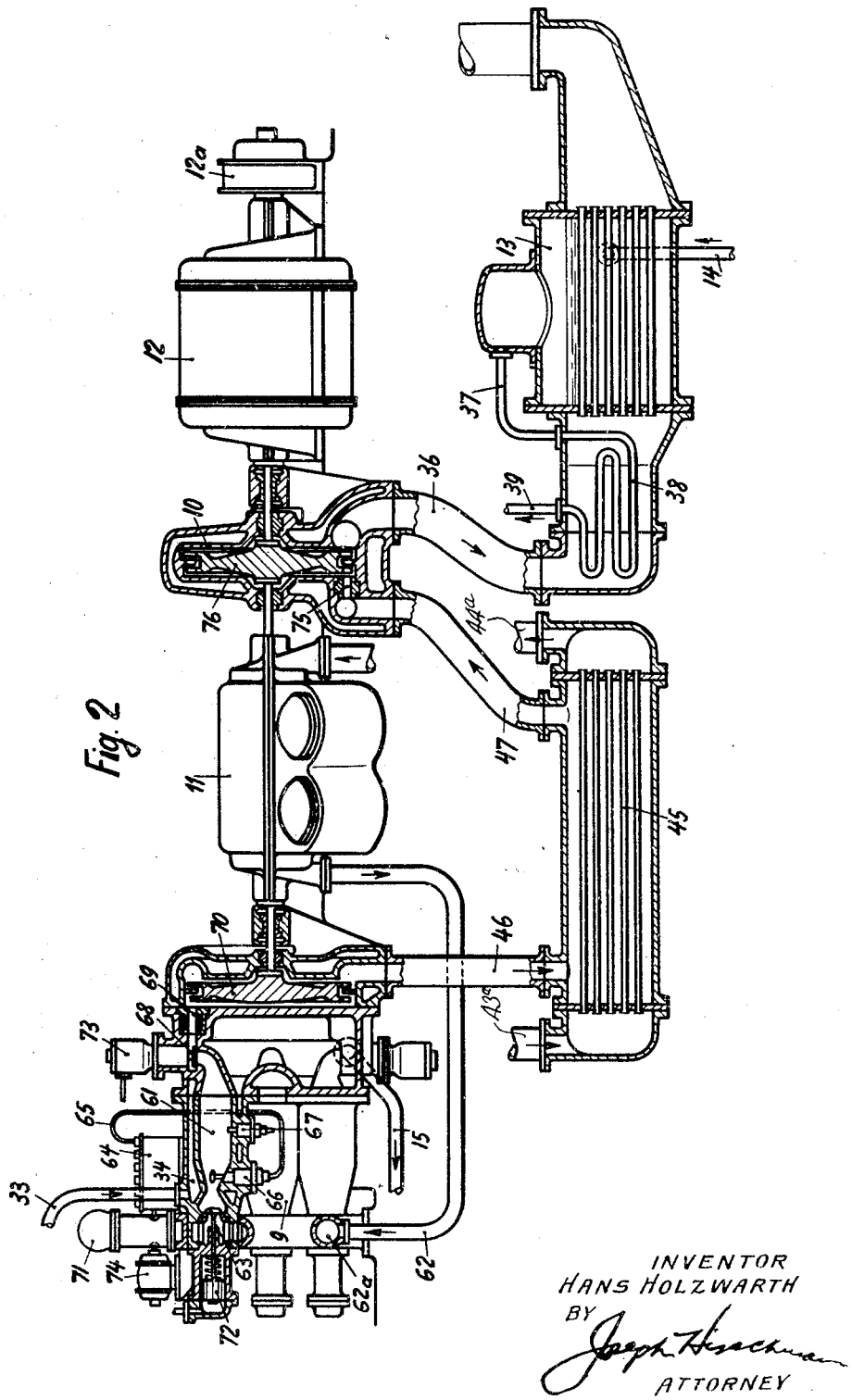

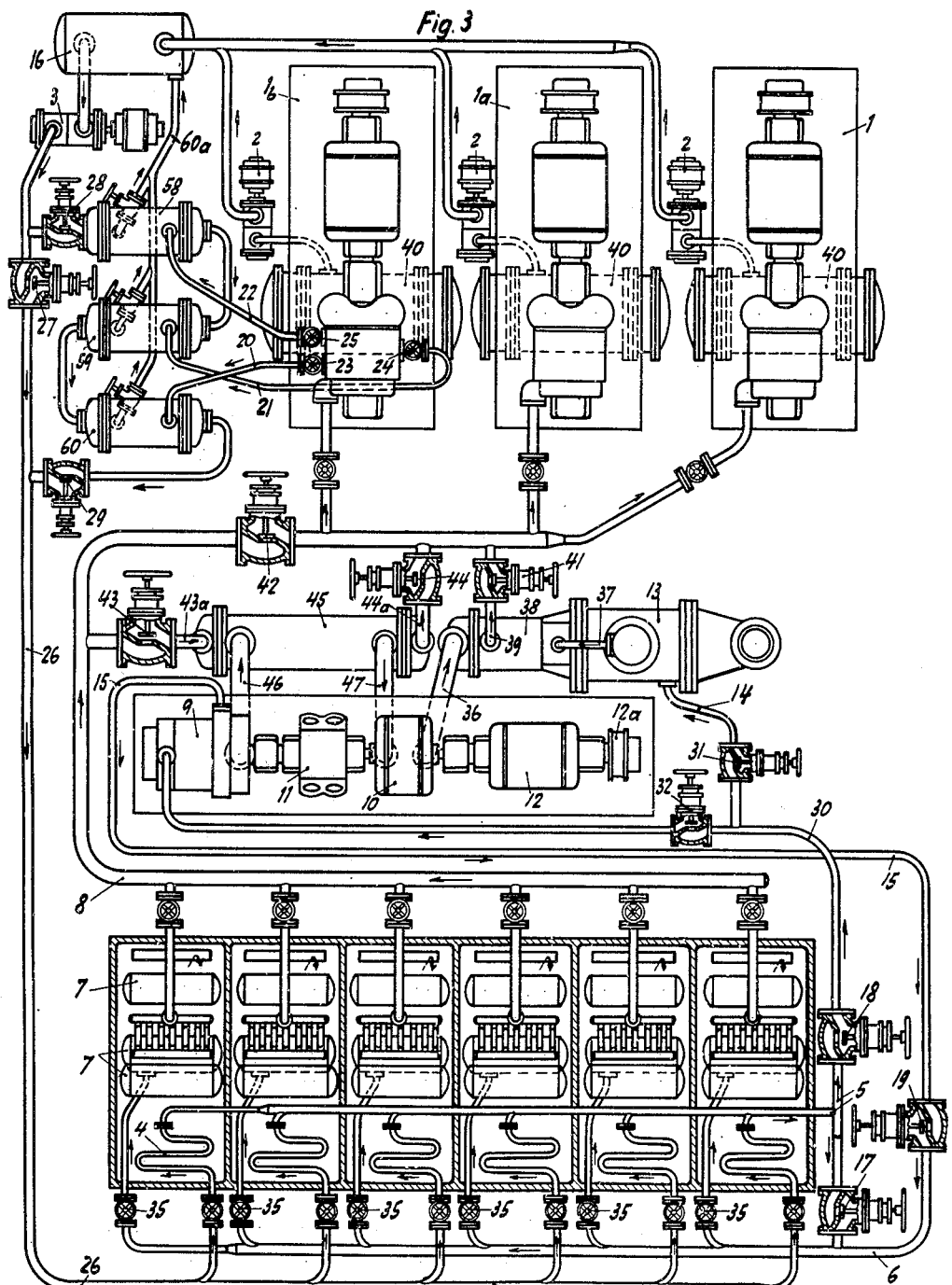

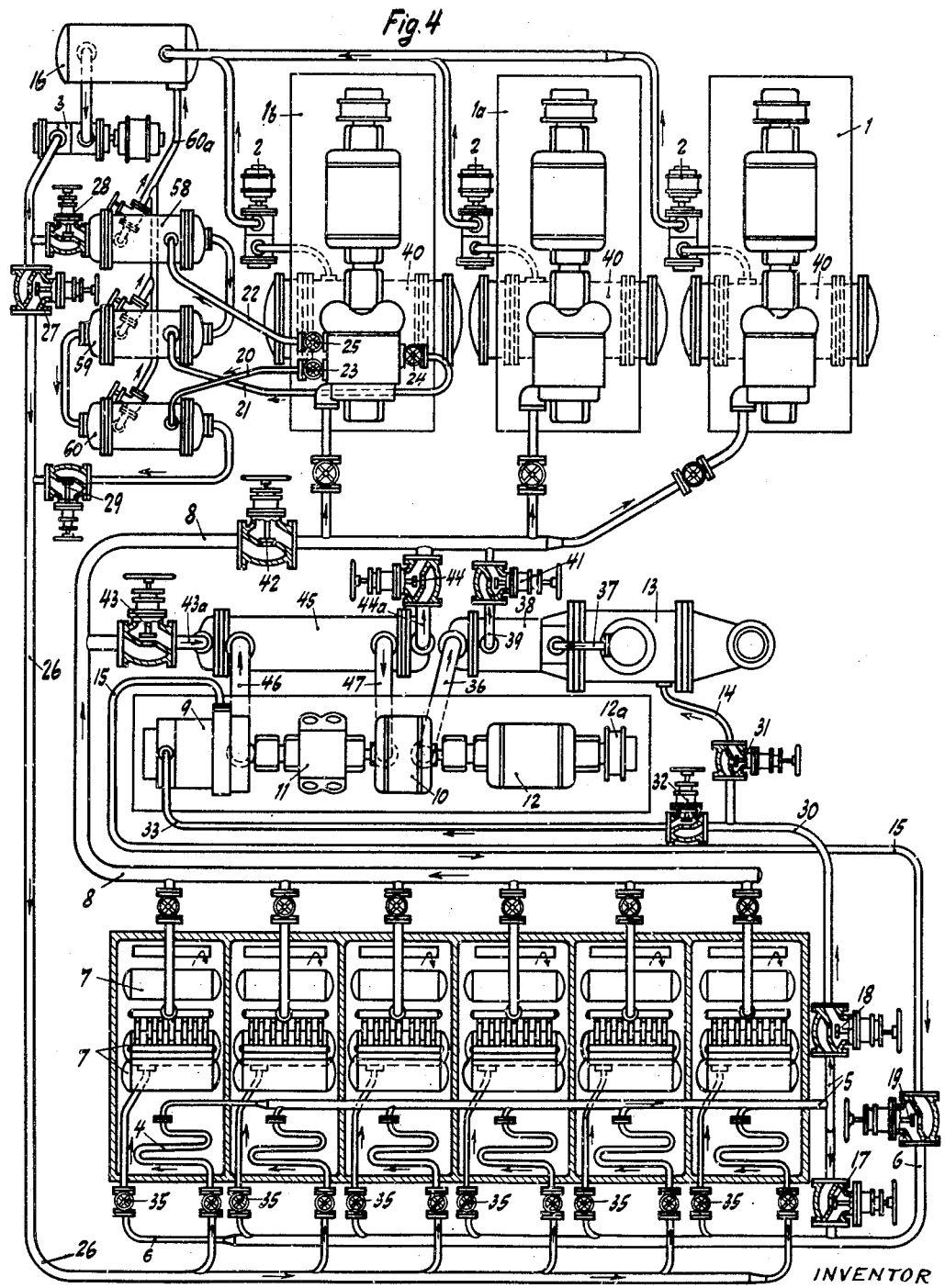

2,086,553

UNITED STATES PATENT OFFICE 2,086,553

APPARATUS FOR CARRYING THE PEAK LOADS OF POWER PLANTS

Hans Holzwarth, Dusseldorf, Germany, assignor to Holzwarth Gas Turbine Co., San Francisco, Calif., a corporation of Delaware Application October 19, 1933, Serial No. 694,243
In Germany July 21, 1930

10 Claims. (Cl. 60—49)

The present invention relates to an arrangement for carrying the peak loads of a heat engine plant, such as a steam turbine plant, and has for its primary object to provide a combined steam and explosion gas turbine plant wherein the additional energy required to carry the peak loads is efficiently and conveniently supplied by the explosion gas turbine section of the plant.

The carrying of peak or over-loads in heat engine power plants is accomplished in a great variety of ways, among the more common of which are overloading of the boiler or the use of water accumulator plants, Ruth steam accumulators and Diesel engines. All of these measures, however, are subject to one or more of the disadvantages of low efficiency, dependence upon mountainous country, limitation to low pressures, high radiation losses, and high investment cost.

The present invention provides a method of and apparatus for carrying the peak loads in heat engine power plants whereby the necessary increase in output is obtained with comparatively small initial investment costs and with simultaneous increase in over-all economy of the plant. The invention may be briefly described as comprising the transference to the operating media of the heat power plant, of heat, and particularly of waste heat, from an explosion gas turbine plant, the output of the heat power plant being directly increased also by the mechanical output of such gas turbine plant. All of the operating media of a heat power plant may be utilized for taking up heat from the gas turbine plant in a variety of ways. In a steam power plant, for example, the temperature of the boiler feed water can be increased in a heat exchanger heated with the exhaust gases of the explosion turbine plant, or in the cooling jackets of the gas turbine plant, or in both. The increase in temperature of the boiler feed water through the waste heat of the explosion turbine plant may be advantageously accomplished after the feed water has been initially preheated in the economizers of the steam plant. In this way it is possible, by employing an explosion turbine plant in the combination indicated, not only to deliver to the power line energy generated directly by such gas turbine plant, but also to increase the amount of steam available for the steam engines, or the available heat content of the steam, and thereby cause such engines to deliver an increased output into the power lines. If, for example, an explosion turbine plant is employed having a generator output of about 10,000 kw., the described method of operation can be carried out in combination with a steam boiler plant which normally generates steam for producing about 33,000 kw. The increase in output of the boiler due to increased preheating of the feed water (initially heated in the economizers of the steam plant) by means of the waste heat of the gas turbine plant, amounts to about 11,000 kw. There are thus available the following outputs for carrying the peak loads under parallel operation of the gas turbine and steam plants:

|  | Kilowatts |
|---|---|
| Normal capacity of steam turbo-dynamos | 33,000 |
| Increase in capacity by preheating of the boiler feed water with the waste heat of the gas turbine plant | 11,000 |
| Capacity of the generator of the explosion turbine plant | 10,000 |
| Total output | 54,000 | that is, an increase in capacity of about 64% over the normal capacity of the plant is obtained, in spite of the fact that the engine employed for taking care of the peak loads delivers in mechanical output only about 30% of the normal capacity of the steam plant. It will thus be apparent that the heat economy of the combined steam and gas turbine plant is increased as compared with the sum of the outputs of the two plants operated separately. The 10,000 kw. delivered by the explosion turbine plant are generated at a heat efficiency of about 35%, while the steam plant produces energy at a heat efficiency of about 25%. During normal operation, that is, when the steam plant only is in use, the gas turbine plant being idle, energy is delivered likewise at a heat efficiency of 25%. Consequently, by connecting both plants in parallel for carrying peak loads, the heat efficiency of the total plant is not only not diminished, but actually improved.

This increase in efficiency is obtained with only a very small investment outlay, since the capital investment for an explosion turbine plant which is to serve only for taking care of peak loads, is considerably smaller than that for a gas turbine plant which does not operate in combination with a steam plant, because in the latter case a separate steam turbine must be provided for utilizing the steam generated by means of the waste heat of the gas turbine plant.

My improved power plant and mode of operation are not limited to the preheating of the boiler feed water by means of the waste heat of the gas turbine plant. The waste heat of the latter can be utilized also to generate steam, and such steam can then be utilized directly in the steam engine section of the plant.

Finally, the waste heat of the gas turbine plant can be employed for preheating the fresh air which is conducted to the steam boilers. The preheating of the fresh air may be accomplished in a very simple manner by discharging the exhaust gases of the gas turbine plant, and particularly of the continuous turbine or turbines following the explosion or impulse turbine, into the combustion spaces of a steam boiler plant, or into a mixing chamber in advance of such combustion spaces, where they mix with the fresh air and preheat the latter.

The present invention thus contemplates an arrangement wherein, during the idle condition of the gas turbine plant which is to serve for carrying peak loads, no heat is conducted from the gas turbine plant to the operating media of the steam plant, the circuit of the operating media of the steam plant thereby being separate from the gas turbine plant when the latter is idle. In the further development of the invention, cognizance is taken of my discovery that additional advantages arise when the cooling jackets of the explosion turbine plant are connected with the conduits for the heated operating media of the heat power plant also during the periods of inactivity of such explosion turbine plant. In the latter case, a very desirable heating of the gas turbine plant takes place which maintains the latter in constant readiness for operation. Sudden excess loads can then immediately be taken care of without troublesome and time-consuming warming up of the gas turbine plant, so that the suitability of the gas turbine plant as a peak load machine is increased. If the heat power plant is in the form of a steam plant, then the cooling jackets of the explosion turbine plant may advantageously be connected, during the inactivity of the latter, with the conduits for the feed water which has been preheated in the economizers of the steam plant. In such case it is not necessary that all of the cooling jackets of the explosion turbine plant be traversed by the heated operating medium or media of the heat power plant; it is sufficient to heat only the walls of those cooling jackets which are particularly necessary for keeping the gas engine in readiness for operation, such as the walls of the jackets surrounding the explosion chambers of the explosion turbine. It is also not necessary that the cooling jackets be traversed by the preheated operating media of the steam plant during the whole period of inactivity of the explosion turbine plant; it will generally suffice, if the peak loads can be anticipated, to connect such cooling jackets with the conduits which convey the heated operating media of the heat power plant a short time before the appearance of the peak load.

The present application is a continuation in part of my copending application Serial No. 551,811, filed July 18, 1931, now abandoned.

The accompanying drawings illustrate diagrammatically an embodiment of the invention in a combined steam and gas turbine power plant; in said drawings Fig. 1 shows the connection of the steam and gas turbine sections of the power plant in an arrangement according to the invention in which a gas turbine acts as a peak load engine for the steam plant, the valves being shown in the normal condition of operation of the steam plant, the gas plant being idle and the feed-water being first heated by the condensation of steam tapped from a turbine and then further heated in economizers before being charged into the boilers;

Fig. 2 illustrates the gas turbine plant in section on an enlarged scale;

Fig. 3 shows the arrangement of the valves for cutting out the pre-heating of the feed water with tapped steam and for causing the feed water, after preliminary heating in the economizers, to be further pre-heated in the cooling jackets of the explosion chambers of the gas plant, the figure showing also the arrangement of the valves for effecting priming of the explosion chambers with the pre-heated feed water of the steam plant;

Fig. 4 illustrates the setting of the valves for causing part of the feed water to be vaporized and the steam superheated with the exhaust gases of the gas turbine plant;

Fig. 5 is a section through a feed water preheater operated with tapped steam; and Fig. 6 is a section through one of the boilers forming part of the steam plant.

Figure 1:
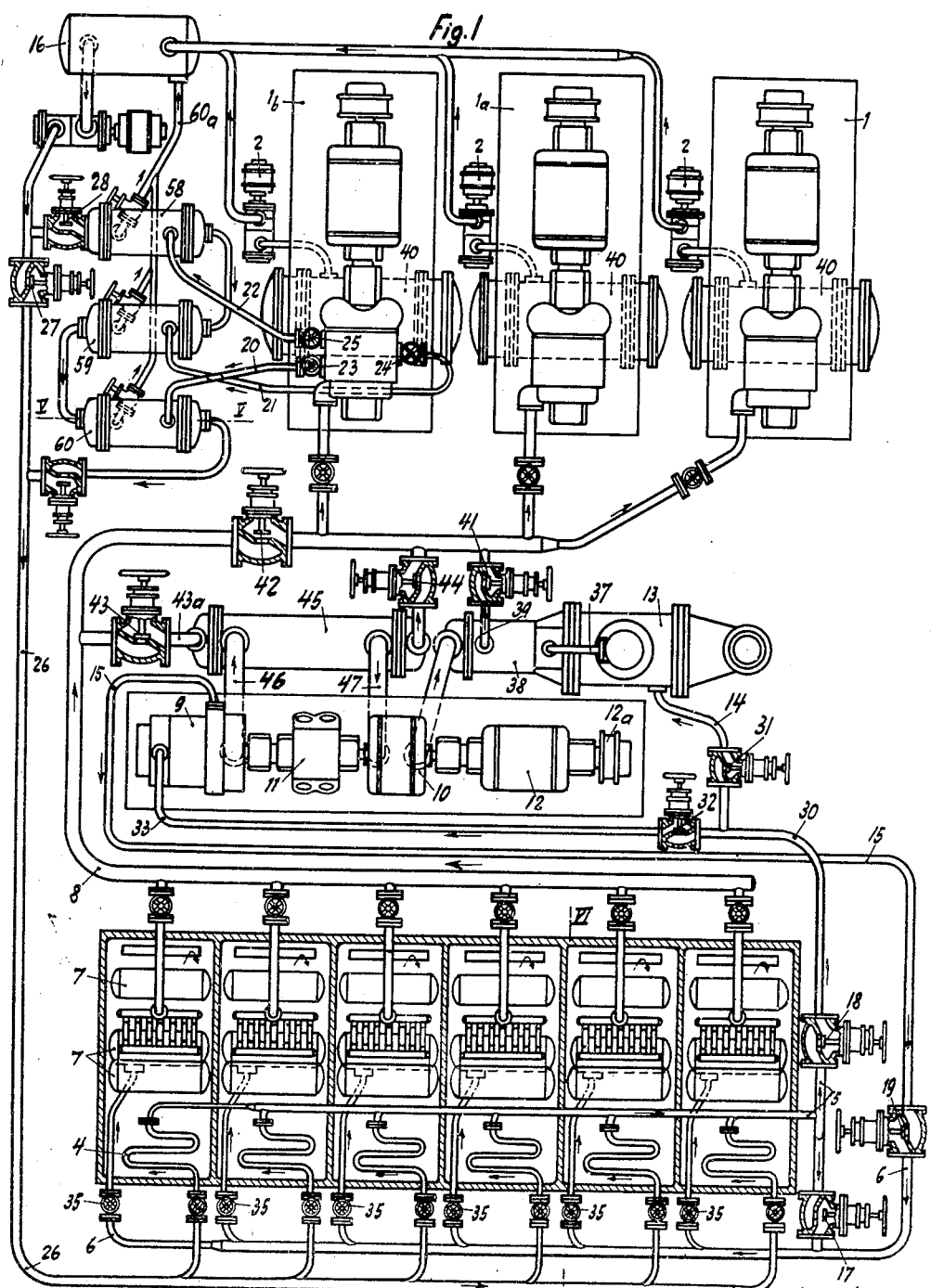

The numerals 1, 1a, 1b indicate the steam turbine dynamo aggregates of the power plant including the associated condensers 40; 2 indicates the condensate pumps, 3 the boiler feed pump, 4 the economizers, 5 the collecting conduit or manifold for the preheated boiler feed water to the rear of the economizers 4, 6 the collecting conduit or manifold for the feed water in advance of the steam boilers 7, and 8 the steam collecting conduit to the rear of the boilers 7.

In the gas turbine section of the plant, which is constructed and designed to take up the peak loads, the numeral 9 (see Fig. 2) designates the explosion turbine, 10 the continuous current gas turbine, 11 the air compressor, 12 the electric generator, 13 the heat exchanger fed with the exhaust gases of the continuous current turbine 10, 14 the connecting conduit between the heat exchanger 13 and the manifold 5 for the boiler feed-water which is preheated in the economizers, and 15 the connecting conduit between the pressure-proof cooling chambers of the explosion turbine 9 and the manifold 6 for the highly preheated boiler feed-water which is charged into the boilers 7. An exciter is shown at 12a. In order to equalize the feed-water requirements, which vary to a considerable extent, there is provided a condensate reservoir 16 with sufficient reserve for peak loads.

As shown in Fig. 2, a heat exchanger 45 is arranged in the path of the gases exhausting from the explosion turbine 9, such exchanger receiving steam from conduit 8 through valve 43 and pipe 43a for superheating therein, the superheated steam being discharged through pipe 44a and valve 44.

The other details of the plant and the operation thereof will now be described in connection with the various circuits which are provided in accordance with the invention between the main steam plant and the auxiliary gas turbine plant.

*Circuit I.*—Preheated feed water of the steam plant is caused to flow through the cooling jackets of the explosion turbine and then to the steam boiler.

The feed water from the feed water tank 16 (condensate collector) is forced by the feed water pump 3 (see Figs. 3 and 4) through the conduit 26 to the economizers 4 in which it is preheated. The valve 27 is open and the valves 28 and 29 closed. The preheated feed water leaves the economizers through the collecting conduit 5. The valve 17 being closed and the valve 18 open, the feed water flows into the conduit 30 and from the latter into the conduit 33 through the open valve 32, the valve 31 being closed; it then flows from conduit 33 into the cooling jacket 34 (see Fig. 2) of the explosion turbine 9. The heated feed water is withdrawn from the cooling jackets by pipe 15 and flows through valve 19 into conduit 6, from which it is distributed by the valves 35 to the boiler elements 7 wherein it is vaporized. The generated steam is collected in the live steam conduit 8 and then distributed to the turbines 1, 1a and 1b through the open valve 42, the valve 43 being closed. After performing work the steam is condensed in the condensers 40 and is returned by the pumps 2 to the feed water tank 16.

*Circuit II.*—Preheated feed water of the steam plant is vaporized in a waste heat boiler behind the continuous current gas turbine; and the generated steam is superheated by the gases exhausting from such turbine and then flows to the turbines of the steam plant (see Fig. 4).

The preheated feed water which flows to the conduit 30 from the economizers in the manner described above flows through the valve 31, upon partly closing valve 32, to the conduit 14 and then to the waste heat boiler 13. The feed water is vaporized in such boiler by the gases exhausting from the continuous current gas turbine 10 through the conduit 36, as shown in section in Fig. 2. The generated steam flows through conduit 37 to the superheating coil 38 and from the latter it enters the steam collecting conduit 8 through conduit 39 and valve 41. In this conduit the steam mixes with steam generated in the boilers 7 from feed water entering the latter through valve 17 or 19 and distributing valves 35. From the conduit 8 the steam is conveyed to the turbines 1, 1a, 1b as described under Circuit I.

*Circuit III.*—The steam generated in the steam plant is superheated by the gases between the explosion and continuous current gas turbines and then flows to the turbines of the steam plant (see Figs. 3 and 4).

The steam generated in the steam boiler with water that has been preheated, for example, in the cooling jackets of the explosion turbine 9 can be conducted through the superheater 45 by closing valve 42 and opening valves 43 and 44, such superheater being heated by the combustion gases flowing from the explosion turbine 9 through conduit 46, the gases then entering the continuous current turbine 10 through conduit 47. The superheated steam then flows behind the closed valve 42 again into the steam conduit 8, from which it is charged to the steam engines.

*Circuit IV.*—Tapped steam condensed in the feed water preheaters can be made useful for power production by cutting out the preheaters, in which case the preheating otherwise produced by the tapped steam in such preheaters is taken over by the heat abstracted in the cooling of the explosion turbine (Figs. 3 and 4).

The feed water charged by the pump 3 is fed in the normal operation of the plant, when the valve 27 is closed (Fig. 1), through the open valve 28 and feed water preheaters 58, 59 and 60 and through the open valve 29 into the conduit 26. In this way the feed water is preheated in the preheaters by condensation of tapped steam which is bled from the turbine 1b by conduits 20, 21 and 22. The so formed condensate flows at the corresponding tapped steam pressure to the condensate tank 16 through conduit 60a. Following this preheating the temperature of the feed water is raised to the highest permissible degree in the economizers 4. The highly heated feed water flows into the conduit 5 and in normal operation, when the explosion turbine plant is idle, flows either into conduit 6 through the open valve 17, the valve 18 being closed, or as described under Circuit I, upon closing of valve 17, flows through open valve 18 into conduit 30, and valve 31 being closed, passes through open valve 32 into conduit 33. It traverses the cooling jacket 34 of the explosion turbine 9 and only thereafter flows through the conduits 15 and 6 and valves 19 and 35 into the vaporizing elements 7 of the boilers of the steam plant. In normal operation, therefore, the preheating of the feed water is accomplished to the greatest possible degree with means forming part of the steam plant. The so preheated feed water can be employed continuously for heating the explosion chambers of the explosion turbine plant, or such heating may be begun only as soon as it becomes evident that the explosion turbine plant will have to be set into operation. If an overload is imposed on the steam plant, the heated chambers of the explosion turbine plant can first be set into immediate operation, while increased power production in the steam plant can be secured by closing the bleeder valves 23, 24 and 25 (Figs. 3 and 4), so that the flow of steam from turbine 1b through conduits 20, 21 and 22 is cut off and said steam caused to do work in such turbine. The explosion turbine automatically gives up the heat of radiation of its explosion chambers to the feed water flowing thereto through the conduit 33, and thus replaces fully and completely the preheating in the preheater 58, 59 and 60 by tapped steam.

Fig. 2 shows the details of the explosion turbine plant. The explosion chambers 61 are each charged with air in known manner through conduit 62, air manifold 62a, and air valve 63. The fuel is simultaneously introduced by the fuel pump 64 through conduit 65 and injector valve 66. When all the valves of the chamber 61 are closed, ignition is effected by the spark plug 67. When the combustion is complete the outlet or nozzle valve 68 is opened and permits the gases to flow through expansion nozzle 69, where they are partially expanded, to the explosion turbine rotor 70. The control of the valves is effected in known manner by means of a pressure oil distributor 71 which at the proper instant brings pressure oil to act upon the piston 72 of the air inlet valve 63 or in the cylinder 73 of the nozzle valve 68 which is constructed similarly to the air valve except that the oil acts on the underside of the piston. The oil distributor 71 and fuel pump 64 are driven by an electric motor 74. The combustion gases leaving the rotor 70 under pressure flow through conduit 46 to the superheater 45 and then pass through conduit 47 to the expansion nozzle 75 of the continuous current gas turbine 10. The gases perform work in the blades 76 of the rotor 70 of such turbine and then flow through conduit 36 through the subsequent heat exchanger 13.

By the term "operating medium" as used in the claims is to be understood any of the fluids employed in the normal operation of the heat power plant; in the case of a steam plant, such term includes the liquid feed-water, the vaporous steam, the gaseous superheated steam and the combustion-supporting air for the boiler.

The word "economizer" in the following claims is to be understood as including all kinds and all combinations of feed water heaters.

The boilers 7 will generally be provided with superheaters as usual and the steam generated in said boilers will then be additionally heated to a higher temperature by means of the waste heat of the gas turbine plant in the superheater 45, the valves 43 and 44 being open and the valve 42 closed. Such additional superheating is of special advantage when overloading occurs as then the temperature which the steam attains in the standard superheaters of the boilers 7 has a tendency to decrease. The additional superheating as described for Circuit II may be equally well employed with other circuits. The different circuits as described above do not represent the alone useful combinations, they may be combined with each other in part to produce different modes or combinations of heat transfer between the steam and gas turbine plants.

I claim:

1. A power plant comprising a steam plant section including a furnace and boilers adapted to be continuously operated and having a capacity sufficient to meet the normal external load imposed on the plant during the greater part of the day, and a steam engine continuously operated with the steam generated in said boilers; and apparatus for assisting said steam plant in carrying the temporary peak loads of the plant, comprising a gas turbine plant section of lower capacity than said steam plant but sufficient to raise the normal output of the plant to the peak load output; said gas turbine plant including a jacketed pistonless combustion chamber, one or more gas turbines driven by the gases generated in such chamber, and an output machine driven thereby; means for preheating the feed water of the steam plant section; a conduit for conducting the so preheated feed water into the cooling jackets of the combustion chamber of the gas turbine plant to be further heated therein; and means for conveying the doubly preheated water into the boilers of the steam plant; whereby the output of the steam plant section is increased by such transferred heat and is further directly increased by the mechanical output of the gas turbine plant.

2. A power plant comprising a steam plant section including a furnace and boilers adapted to be continuously operated and having a capacity sufficient to meet the normal external load imposed on the plant during the greater part of the day, and a steam engine continuously operated with the steam generated in said boilers; and apparatus for assisting said steam plant in carrying the temporary peak loads of the plant, comprising a gas turbine plant section of lower capacity than said steam plant but sufficient to raise the normal output of the plant to the peak load output; said gas turbine plant including a jacketed pistonless, combustion chamber, one or more gas turbines driven by the gases generated in such chamber, and an output machine driven thereby; a heat exchanger in the steam plant for initially heating an operating medium of said plant; means for conducting such preheated operating medium of the steam plant through the cooling jackets of the gas turbine plant to prime the latter shortly before the advent of the peak load, and means for transferring waste heat of the gas turbine plant to an operating medium of the steam plant, whereby the output of the steam plant section is increased by such transferred heat and is further directly increased by the mechanical output of the gas turbine plant.

3. A power plant comprising a steam plant section including a furnace and boilers adapted to be continuously operated and having a capacity sufficient to meet the normal external load imposed on the plant during the greater part of the day, and a steam engine continuously operated with the steam generated in said boilers; and apparatus for assisting said steam plant section in carrying the temporary peak loads of the plant comprising a constant volume explosion gas turbine which is adapted to contribute an amount of power equal to the difference between the peak load of the plant and the normal output of the steam section; said gas turbine plant including a jacketed, pistonless constant volume explosion chamber, and one or more gas turbines driven by the gases generated in such chamber; a heat exchanger in the steam plant for initially heating an operating medium of said plant; means for conducting such pre-heated operating medium of the steam plant through the cooling jackets of the gas turbine plant shortly before the advent of the peak load, and mechanism for connecting such conducting means with and disconnecting the same from the gas turbine plant shortly before and after, respectively, the advent of the peak load condition, whereby during the peak load condition the normal output of the steam plant section is increased by the waste heat of the gas turbine plant and is further directly increased by the mechanical output of such gas turbine plant.

4. A power plant comprising a steam plant section including a furnace and boilers adapted to be continuously operated and having a capacity sufficient to meet the normal external load imposed on the plant during the greater part of the day; apparatus for assisting said steam plant section in carrying the temporary peak loads of the plant comprising a constant volume explosion gas turbine which is adapted to contribute an amount of power equal to the difference between the peak load of the plant and the normal output of the steam section; said gas turbine plant including a jacketed, pistonless constant volume explosion chamber, and one or more gas turbines driven by the gases generated in such chamber; means for conducting a heated operating medium of the steam plant through the cooling jackets of the gas turbine plant shortly before the advent of the peak load, mechanism for connecting such conducting means with and disconnecting the same from the gas turbine plant shortly before and after, respectively, the advent of the peak load condition, and means for transferring the waste heat of the exhausted explosion gases to at least one of the operating media of the steam plant, whereby during the peak load condition the normal output of the steam plant section is increased by the waste heat of the gas turbine plant and is further directly increased by the mechanical output of such gas turbine plant, the ratio of the normal capacity of the steam plant to the mechanical output of the explosion turbine plant being approximately as 33 to 10; whereby the amount of waste heat that can be transferred from the gas turbine plant to the operating media of the steam plant is of the order of 11 and can all be utilized in such steam plant during the peak load condition.

5. A power plant as set forth in claim 3 including means for transferring to one or more of the operating media of the steam plant part of the heat of the live explosion gases before their entry into the last turbine stage and also the heat of the completely exhausted gases.

6. A power plant comprising a steam plant section including a furnace and boilers adapted to be continuously operated and having a capacity sufficient to meet the normal external load imposed on the plant during the greater part of the day; apparatus for assisting said steam plant section in carrying the temporary peak loads of the plant comprising a constant volume explosion gas turbine which is adapted to contribute an amount of power equal to the difference between the peak load of the plant and the normal output of the steam section; said gas turbine plant including a jacketed, pistonless constant volume explosion chamber, and one or more gas turbines driven by the gases generated in such chamber; means for conducting a heated operating medium of the steam plant through the cooling jackets of the gas turbine plant shortly before the advent of the peak load, and mechanism for connecting such conducting means with and disconnecting the same from the gas turbine plant shortly before and after, respectively, the advent of the peak load condition, whereby during the peak load condition the normal output of the steam plant section is increased by the waste heat of the gas turbine plant and is further directly increased by the mechanical output of such gas turbine plant, the said gas turbine plant comprising an impulse gas turbine and a continuous current gas turbine, a heat exchanger in the path of the gases from the first to the second turbine, and means for conveying steam into said heat exchanger to be superheated therein for use in the steam plant.

7. A power plant comprising a steam plant section including a furnace and boilers adapted to be continuously operated and having a capacity sufficient to meet the normal external load imposed on the plant during the greater part of the day; apparatus for assisting said steam plant section in carrying the temporary peak loads of the plant comprising a constant volume explosion gas turbine which is adapted to contribute an amount of power equal to the difference between the peak load of the plant and the normal output of the steam section; said gas turbine plant including a jacketed, pistonless constant volume explosion chamber, and one or more gas turbines driven by the gases generated in such chamber; means for conducting a heated operating medium of the steam plant through the cooling jackets of the gas turbine plant shortly before the advent of the peak load, and mechanism for connecting such conducting means with and disconnecting the same from the gas turbine plant shortly before and after, respectively, the advent of the peak load condition, whereby during the peak load condition the normal output of the steam plant section is increased by the waste heat of the gas turbine plant and is further directly increased by the mechanical output of such gas turbine plant, the said steam plant section including feed water preheaters heated by bleeder steam, and a feed water heater arranged in the boiler furnace, said means and mechanism including valves and conduits so disposed in the feed water distributing system that upon the advent of a peak load the steam-heated feed water preheater is cut out and the water preheated in the furnace preheater is directed into the cooling jackets of the gas turbine plant.

8. A power plant comprising a steam plant section including a furnace and boilers adapted to be continuously operated and having a capacity sufficient to meet the normal external load imposed on the plant during the greater part of the day; apparatus for assisting said steam plant section in carrying the temporary peak loads of the plant comprising a constant volume explosion plant section which is adapted to contribute an amount of power equal to the difference between the peak load of the plant and the normal output of the steam section; said explosion plant section including a jacketed, pistonless constant volume explosion chamber, and apparatus operated by the gases generated in such chamber; means for conducting a heated operating medium of the steam plant through the cooling jackets of the explosion plant section shortly before the advent of the peak load, and mechanism for connecting such conducting means with and disconnecting the same from the explosion plant section shortly before and after, respectively, the advent of the peak load condition, whereby during the peak load condition the normal output of the steam plant section is increased by the waste heat of the explosion plant section, the said explosion plant section comprising apparatus arranged to receive the gases as they discharge from the explosion chamber and utilizing the higher temperature and pressure range of the gases, a turbine connected to said apparatus to receive the partially exhausted gases discharging therefrom, a heat exchanger in the path of the gases from said apparatus to said turbine, and means for conveying steam into said heat exchanger to be superheated therein for use in the steam plant.

9. A power plant comprising a steam plant section including a furnace and boilers adapted to be continuously operated and having a capacity sufficient to meet the normal external load imposed on the plant during the greater part of the day; apparatus for assisting said steam plant section in carrying the temporary peak loads of the plant comprising a constant volume explosion plant section which is adapted to contribute an amount of power equal to the difference between the peak load of the plant and the normal output of the steam section; said explosion plant section including a jacketed, pistonless constant volume explosion chamber, and apparatus operated by the gases generated in such chamber; means for conducting a heated operating medium of the steam plant through the cooling jackets of the explosion plant section shortly before the advent of the peak load, and mechanism for connecting such conducting means with and disconnecting the same from the explosion plant section shortly before and after, respectively, the advent of the peak load condition, whereby during the peak load condition the normal output of the steam plant section is increased by the output of said apparatus, the said steam plant section including feed water preheaters heated by bleeder steam, and a feed water heater arranged in the boiler furnace, and said means and mechanism including valves and conduits so disposed in the feed water distributing system that upon the advent of a peak load the steam-heated feed water preheater can be cut out and the water preheated in the furnace preheater then directed into the cooling jackets of the explosion plant section.

10. A power plant comprising a steam plant section including a furnace and boilers adapted to be continuously operated and having a capacity sufficient to meet the normal external load imposed on the plant during the greater part of the day, and a steam engine continuously operated with the steam generated in said boilers; apparatus for assisting said steam plant section in carrying the temporary peak loads of the plant comprising a constant volume explosion gas turbine which is adapted to contribute an amount of power equal to the difference between the peak load of the plant and the normal output of the steam section; said gas turbine plant including a jacketed, pistonless constant volume explosion chamber, and two gas turbines driven in series by the gases generated in such chamber; means for conducting an operating medium of the steam plant through the cooling jackets of said explosion chamber, a heat exchanger in the path of the explosion gases between the two turbine stages and conduits for directing an operating medium of the steam plant into said exchanger and returning it at increased temperature to the steam plant, whereby during the peak load condition the normal output of the steam plant section is increased by the waste heat of the gas turbine plant and also by the excessive heat of the explosion gases.

HANS HOLZWARTH.